United States Patent [19]
Miyamoto et al.

[11] Patent Number: 5,189,519
[45] Date of Patent: Feb. 23, 1993

[54] ELECTRONIC CAMERA WITH EXPOSURE CONTROL

[75] Inventors: Ryosuke Miyamoto; Makoto Sekita; Shohei Takeda, all of Kanagawa, Japan

[73] Assignee: Canon Kabushiki Kaisha, Tokyo, Japan

[21] Appl. No.: 325,547

[22] Filed: Mar. 20, 1989

[30] Foreign Application Priority Data

| Mar. 22, 1988 | [JP] | Japan | 63-065859 |
| Jun. 7, 1988 | [JP] | Japan | 63-139620 |
| Jun. 7, 1988 | [JP] | Japan | 63-139621 |
| Jun. 16, 1988 | [JP] | Japan | 63-146908 |

[51] Int. Cl.$^5$ .............................................. H04N 5/30
[52] U.S. Cl. ................................... 358/228; 358/209; 358/909
[58] Field of Search ............. 358/228, 475, 406, 487, 358/209, 213.11, 909

[56] References Cited

U.S. PATENT DOCUMENTS

| 4,584,610 | 4/1986 | Mizokami et al. | 358/224 |
| 4,884,144 | 11/1989 | Jinnai et al. | 358/228 |
| 4,918,533 | 4/1990 | Date et al. | 358/228 |
| 4,972,269 | 11/1990 | Fukushima et al. | 358/228 |
| 5,132,802 | 7/1992 | Osthues et al. | 358/209 |

Primary Examiner—Edward L. Coles, Sr.
Assistant Examiner—J. Jackson
Attorney, Agent, or Firm—Robin, Blecker, Daley & Driscoll

[57] ABSTRACT

An electronic camera having an image sensor responsive to a preliminary exposure for producing an output signal, a computing circuit for computing a proper exposure condition on the basis of the signal, and a compensating circuit for compensating the exposure value in accordance with the proper exposure condition is provided with a compensation prohibiting circuit for prohibiting the exposure compensation by the preliminary exposure by taking into account the object condition and the exposure mode.

20 Claims, 10 Drawing Sheets

ELECTRONIC CAMERA WITH EXPOSURE CONTROL

BACKGROUND OF THE INVENTION

1. Field of the Invention

This invention relates to an electronic camera capable of setting an exposure value with or without selection of an exposure compensation by the preliminary exposure.

2. Description of the Related Art

The electronic camera using the image sensor such as CCD in recording pictures on the magnetic disc or the like has a narrower latitude to the quantity of light than the ordinary photographic camera using a silver-halide film and is, therefore, required to make exposures with a higher accuracy. In this respect, there have been many previous proposals. As disclosed in, for example, U.S. Pat. Nos. 4,523,101 and 4,734,777, prior to the main exposure, a preliminary exposure is made on the image sensor. Based on the level of the output signal for this time of the image sensor, the exposure value is compensated in controlling the main exposure. Also, the photographer of good experience sometimes favors the manual exposure mode where a proper exposure value can be obtained by manually controlling the exposure parameter setting means.

In the conventional electronic camera, however, the use of the capability of making the preliminary exposure always leads to occurrence of the compensation of the exposure value by the level of the preliminary output of the image sensor. Therefore, even when the photographer sets a desired exposure value by his hand as he considers it more suitable than the computed one, re-compensation by the preliminary exposure would take place, thus giving rise to a problem that the desired exposure control cannot be made.

Another problem of the above-described conventional example is that since every time a shot is to be taken, the preliminary exposure must be carried out and, after that, the main exposure occurs, the time gap from the moment at which the release button has been pushed down to the moment at which the actual picture is taken is very long. This is disadvantageous when achieving introduction of a capability of taking a series of continuous shots at a high frame rate into the camera.

Again, the image sensor has, despite large consumption of electrical energy, to be driven twice for every one picture, as has been described above. Therefore, the battery to be used must be of large capacity. This has been an obstacle for minimization of the size of the camera body.

The conventional camera in any photographic situation performs twice the opening-and-closing operation. In the case of a long exposure time, therefore, the successive two shutter sounds are heard discretely of each other, irritating the ear. In addition to this problem, there is another one in which the diaphragm has to be maintained stationary in the adjusted position for a long time.

SUMMARY OF THE INVENTION

With such problems in mind, the invention has been made, and its object is to provide an electronic camera in which when an exposure value has been set manually, the re-compensation by the preliminary exposure is prohibited from occurring, thus making it possible to always make desired exposure controls Another object of the invention is in view of the foregoing to provide an exposure control device which enables the frame rate of shootings to be increased and the size of the electronic camera body to be minimized.

Also, the invention is to eliminate the problems inherent in the half-open type shutter.

Another object of the invention is to provide an exposure apparatus which can control exposure with high accuracy regardless of whether or not the running characteristic of the opening and closing members for opening and closing an aperture opening for exposure, or other characteristics, vary and in which when a photographic situation where there is no need to carry out the two cycles of opening and closing operation of the opening and closing members for one picture is encountered, only one cycle can be made sufficient.

In an embodiment of the invention, an electronic camera having computing means for computing a proper exposure condition on the basis of the preliminary exposure on the image sensor in the form of a signal output from the image sensor and compensating means for compensating the exposure by the computed condition is provided with compensation prohibiting means responsive to manual setting of an exposure value for prohibiting the exposure compensation by the preliminary exposure.

In another embodiment of the invention, the electronic camera having the aforesaid computing means and the compensating means is provided with compensation prohibiting means responsive to setting of a flash exposure mode for prohibiting the exposure compensation by the preliminary exposure.

Since, in the electronic camera of the first named embodiment, the preliminary exposure is prohibited from compensating the exposure when the exposure value has been set manually, it is always possible to make the desired exposure control.

Also, in the electronic camera of the second named embodiment, the exposure compensation by the preliminary exposure is prohibited from occurring when in the flash exposure mode. Thus, the desired exposure control can be made too.

In yet another embodiment of the invention, an exposure control device for the electronic camera in which the preliminary exposure and the main exposure controls are made is provided with control means responsive to automatic determination of the distribution of brightness on an object to be photographed for causing either the main exposure control alone or the sequence of the preliminary exposure and the main exposure controls to take place.

The invention by the embodiment described just above can perform a necessary minimum and optimum exposure control depending on the distribution of brightness of the object.

Also, to achieve the above-described objects, in an embodiment of the invention applied to the exposure apparatus in which the opening and closing members such as shutter blades or diaphragm blades for opening and closing an exposure aperture are preliminarily opened and closed prior to that opening and closing operation which makes an actual exposure, then a reference value for use in the actual exposure opening and closing operation is determined on the basis of a value of the quantity of movement or the quantity of exposure detected when in this preliminary opening and closing operation, and then when in the actual exposure opening and closing operation which is carried out after that preliminary opening and closing operation, the opening and closing members are operated according to that reference value, provision is made of opening and closing member drive control means for selectively performing that preliminary opening and closing operation depending on either of a case where the value output from an element for measuring the light quantity of a target to be photographed which becomes the reference value of that preliminary opening and closing operation is outside a certain constant range another case where it is inside the range.

Also, as necessity arises, a comparing circuit for determining the need of the preliminary opening and closing operation and a control circuit are provided, or a mode of carrying out the preliminary opening and closing operation when the value output from the element for measuring the light quantity of the target to be photographed is outside the certain range, another mode of carrying it out whenever shooting, and still another mode of not carrying it out whenever shooting is provided in combination with a switch for the photographer to select one of these modes.

According to this embodiment, in a case where the opening and closing operation of the opening and closing members is determined from the value output from the element for measuring the light quantity of the photographic target to take a longer time than a certain constant value, the preliminary opening and closing operation is not carried out, while it is possible to perform the exposure opening and closing operation by making use of the value output from the element for measuring the light quantity of the photographic target as the reference. Also, in the actual exposure operation, the exposure control adapted to the exposure characteristic or dynamic characteristic is made, and, moreover, even when taking a shot which necessitates a long time of the exposure opening and closing operation, it becomes possible to take the shot without any sense of incompatibility. Also, depending on the photographic condition or the intention of the photographer, even when taking a shot of long time, a possible case where a higher accuracy of exposure is necessary, or even when taking a shot of short time, another possible case where two exposure operation is necessary is considered. Therefore, the mode of carrying out the preliminary opening and closing operation in all shots, or the mode of not carrying it out, and the mode of changing over between these two cases in automatic response to the value from the light measuring element are provided, and a switch for selectively operating these modes by the intention of the photographer is provided. By this provision, the apparatus becomes more easy to use.

Also, to achieve the above-described objects, in another embodiment of the invention applied to the exposure apparatus in which the opening and closing members for opening and closing an aperture for exposure are preliminarily opened and closed prior to an actual exposure operation, then a reference value in the actual exposure or opening and closing operation is determined on the basis of a value such as the quantity of movement or the quantity of exposure detected when in this preliminary opening and closing operation and then when in the actual exposure or opening and closing operation which is carried out after that preliminary opening and closing operation, the opening and closing members are operated according to that reference value, provision is made of a memory circuit for storing the value obtained by the preliminary opening and closing operation for a certain constant time, and a comparing circuit for comparing the value of the memory circuit with a reference exposure quantity, and further provision is made of a recording deck operating in such a manner that while, when the deviation difference compared with the reference value in the comparing circuit is greater than a certain constant value, the exposure operation is carried out again based on the reference value obtained by the preliminary opening and closing, it is when a greater difference than the certain constant value is not found, that the value of the memory circuit is transferred to a recording circuit so that it is recorded.

According to this embodiment, the quantity of exposure of the preliminary opening and closing operation is compared with the reference quantity of exposure and the data obtained from the preliminary opening and closing operation are kept in the memory circuit for the certain constant time. In a case where the comparison value with the reference quantity of exposure does not deviate from the certain constant value, the value of the memory circuit is regarded as the actual exposure value, so that the second cycle of exposure or opening and closing operation is not carried out. Also in a case where a long time is necessary for the exposure, the second cycle of operation is abandoned. In the embodiment of the invention, therefore, in the actual exposure operation, an exposure control adapted to the exposure characteristic or dynamic characteristic is performed. Moreover, when the exposure time is long, or when the deviation from the reference quantity of exposure is not too large, the exposure or opening and closing operation is not carried out for the second time. Thus, the exposure apparatus gives no sense of incompatibility and becomes able to take shots without wastage.

Other objects of the invention and its features will become apparent from the following description and drawings.

DETAILED DESCRIPTION OF THE PREFERRED EMBODIMENTS

Figure 1:
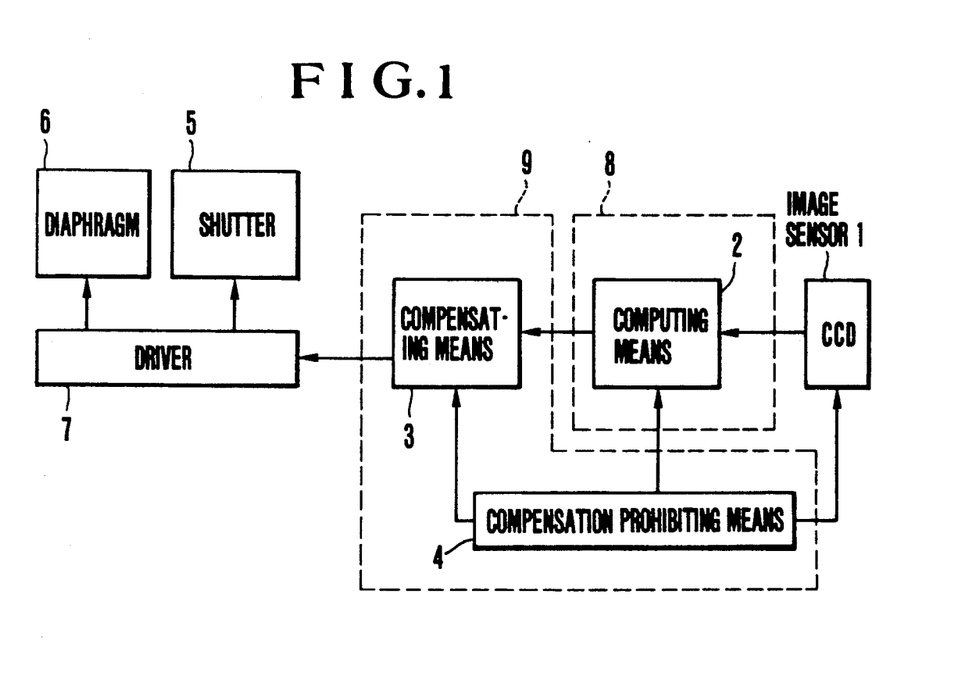
FIG. 1 is a block diagram illustrating a first embodiment of the invention.

FIG. 1 in block diagram shows a first embodiment of the invention. In the figure, 1 is a CCD as an example of an image sensor. After a preliminary exposure has been made on the CCD 1, a proper exposure condition is computed on the basis of a signal output from the CCD 1 by a computing means 2. Responsive to the computed condition, a compensating means 3 makes a compensation on the exposure. When an exposure value has been set by hand, a compensation prohibiting means 4 prohibits the aforesaid exposure compensation by the preliminary exposure from occurring. Thus, the selection of the manual setting leads to stop computation of the exposure by the preliminary exposure. 5 and 6 are a shutter and a diaphragm for controlling the aforesaid exposure. 7 is a driver for driving the shutter 5 and the diaphragm 6.

The electronic camera of the character described is enabled to select either of the exposure compensation by the preliminary exposure or the manual exposure setting, as has been described above. Also, though not shown in the drawings, the video signals output from the CCD 1 can be recorded on a magnetic disc in a jacket. A signal processing circuit 8 for the video signals is made to include the aforesaid computing means 2, while the compensating means 3 and the compensation prohibiting means 4 are included in a system controller 9 which controls the entirety of the system.

Figure 2:
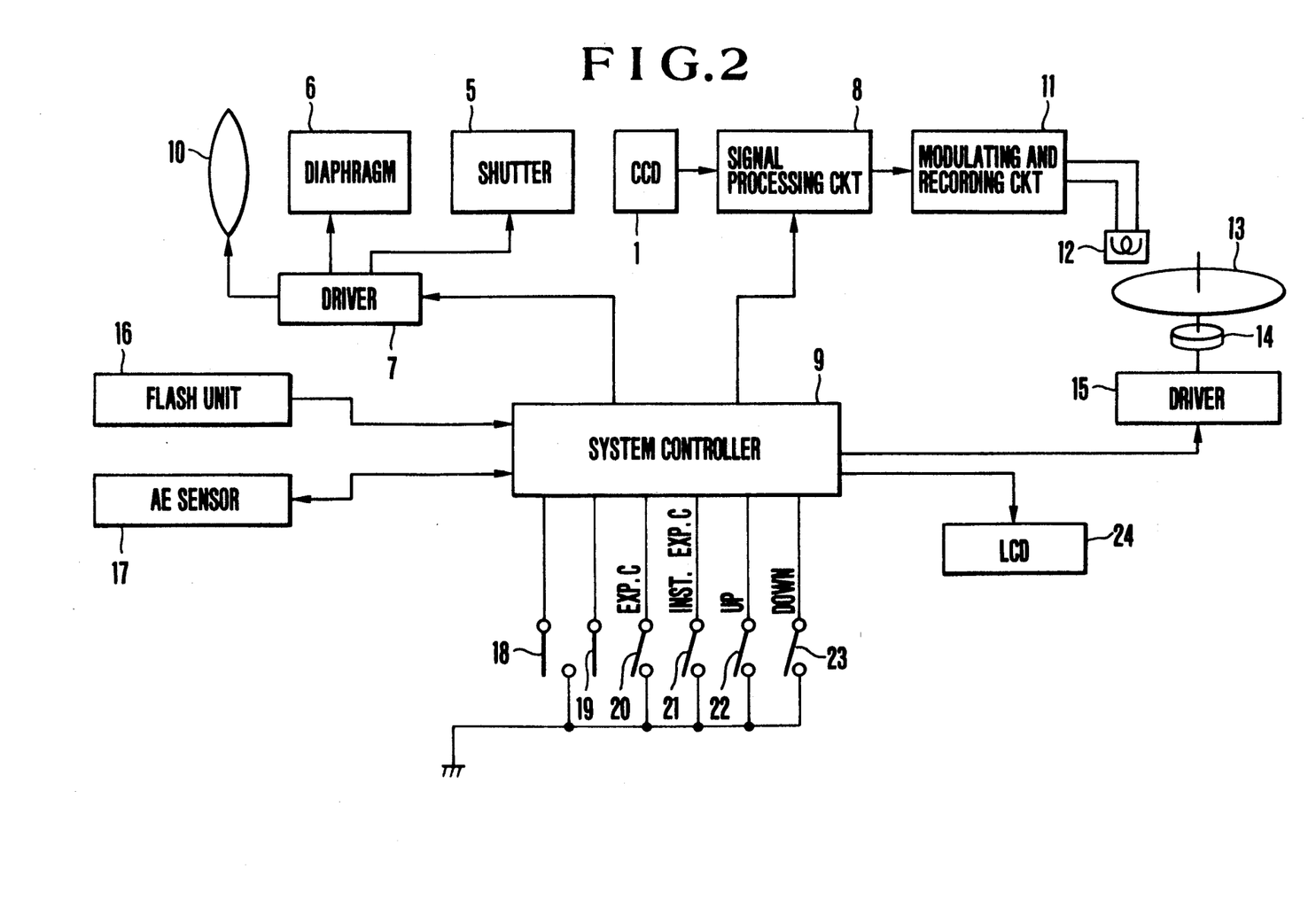
FIG. 2 is a production diagram of the entirety of the electronic camera having the structure of FIG. 1.

FIG. 2 shows the entire construction of the electronic camera having the above-described feature, further including a taking lens 10, a modulation and recording circuit 11 receptive of the video signals that the signal processing circuit 8 has read from the CCD 1 for producing an output which is recorded on the magnetic disc 13 by means of a head 12, a sheet motor 14 for rotating the magnetic disc 13, a driver 15 for driving the sheet motor 14, a flash unit 16 for illuminating an object to be photographed, and an AE sensor 17 for measuring light. When a switch 18 for light measurement is turned on, a light measurement is started. Another switch 19 is for initiating recording of a still picture. Another switch 20 is an actuator for a preliminary exposure (EXP.C). Another switch 21 is used to set the manual mode (INST. EXP.C). In the manual mode, the exposure can be finely adjusted by either of switches 22 and 23 (UP, DOWN). 24 is a liquid crystal display (LCD) for displaying the states of operation of the various portions of the system by the liquid crystal elements.

The operation is as follows:

At first, when shooting normally (in a first mode), the photographer turns on the switch 18 to measure light by the AE sensor 17 and then the switch 19 to initiate an exposure operation. Responsive to turning on of the switch 19, the system controller 9 actuates the driver 15 for the sheet motor 14 to rotate the magnetic disc 13. At the same time, based on the signal output from the AE sensor 17, it computes an exposure condition, i.e., an aperture value of the lens 10 and a shutter time (speed). According to this condition, the shutter 5 and the diaphragm 6 are driven through the driver 7. By this, photo-signals of an object being photographed are stored in the CCD 1. The CCD 1 produces the video signals, which are then read into the signal processing circuit 8. The processed video signals are recorded on the disc 13 by the modulation and recording circuit 11 through the head 12.

Next, a shooting in a second exposure mode using the preliminary exposure, that is, with a feedback compensation, is described. Now suppose, for example, the upper half of the object is very bright, then the shutter 5 blocks the light in the corresponding area of the surface of the CCD 1 to the upper half of the picture. Under this condition, a preliminary exposure is made for a time previously determined (computed) on the basis of the signal output from the AE sensor 17. Then, only that part of the output of the CCD 1 which represents the effective image angle (angular field) is integrated by the signal processing circuit 8. The integrated (averaged) signal is converted into a digital form in the system controller 9 for the purpose of checking the exposure level. At this time, a feedback is applied to the shutter so that the shutter time is compensated in such a manner that the difference between the level of the A/D-converted signal and a reference level is reduced to zero. Thus, the camera is made ready for the main exposure followed by the actual recording of the image.

By such an exposure compensation, the phenomenon of under-exposure by the influence of the very bright environment such as the sky or sun in the upper half of the picture can be prevented. Another advantage is that for a subject of photographic principal interest, the proper exposure control can be performed.

Also, in a case where the photographer desires to manually set the exposure value, he, while maintaining the switch 21 of FIG. 2 in the closed position, pushes the switch 22 or the switch 23 down stroke by stroke. Responsive to this, the system controller 9 determines the value of the shutter time and the aperture value as altered in such a way that every time the UP switch 22 is pushed down, the exposure value is shifted in steps of ¼ EV to the over side. Also, every time the DOWN switch 23 is pushed down, the exposure value is shifted in steps of the same or ¼ EV to the under side.

This exposure control provides a possibility for the user or the photographer of experience to finely adjust the exposure based on his personal insight about the photographic situation. Thus, a more correct or a particular exposure aimed at a special effect can be obtained for the individual scene.

Here, the camera is arranged to operate normally in the second mode. Therefore, responsive to the aforesaid manual setting of, for example, an exposure value of +1.5 EV step, the system controller 9 combines the light value produced by the AE sensor 17 with the correction of +1.5 EV step when it determines the shutter time value and the aperture value. And, since, in this case, the manual setting has been performed, the feedback computation by the preliminary exposure is prohibited. Thus the direct transition to the main exposure takes place. After that, the sequence in the first mode follows to record the shot picture. From this reason, once the photographer has set the correct exposure by his own hand, re-compensation by the preliminary exposure is not allowed to take place. This leads to prevent the adverse compensation from occurring. Hence, the photographer's intention can always be reflected to the exposure control.

It should be noted that the prohibition of the exposure compensation by the preliminary exposure is not limited to the case of manual setting, but the exposure compensation is made prohibited even when in flash photography using the flash unit 16.

Figure 3:
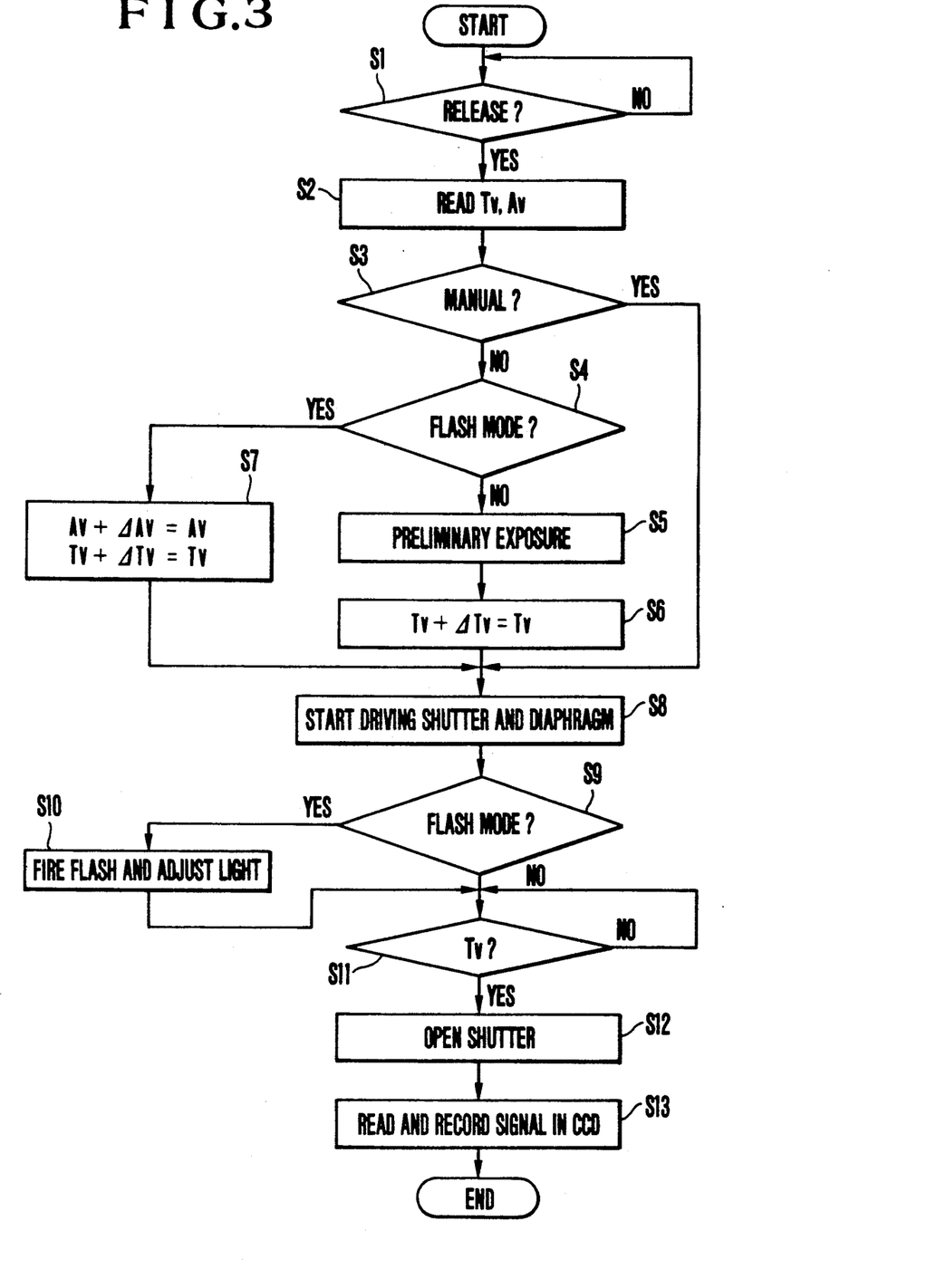
FIG. 3 is a flowchart illustrating the operation of exposure control.

FIG. 3 is a flowchart for the above-described operation.

In the following, by reference to this flowchart, the operation of this embodiment is described in detail.

At first, whether or not the switch 19 for shot (release) is turned on is tested in a step S1. If on, then read the provisional values of the shutter time and diaphragm aperture, or Tv and Av, which have either automatically been set on the basis of the light value obtained from the AE sensor 17 or by hand (step S2).

Next, whether or not the manual mode is selected by the switch 21 for manual setting is tested in a step S3. If not the manual mode, then test whether or not the flash mode using the flash unit 16 is selected by a flash mode switch (not shown) in a step S4.

If not the flash mode in the step S4, the process then advances to a step S5 of carrying out the preliminary exposure. That is, the diaphragm 6 is moved to the size of aperture opening corresponding to the Av. With this, a preliminary exposure (photoelectric conversion) equivalent to the Tv is made while electronically controlling the storing time by controlling the time for which the light impinges on the CCD 1, or by controlling the interval from the clearance to the reading of the CCD 1. After that, from the concurring image signal obtained from the CCD 1 in the step S5, the data of the brightness of the object as measured at the actual aperture is derived and the Tv is compensated in such a manner that the difference between it and the reference level becomes zero, being altered to $Tv + \Delta Tv$ in a step S6.

Meanwhile, if the flash mode has been determined in the step S4 to be selected, then set the predetermined flash exposure value, i.e., a certain aperture value Av (for example, at the full open aperture) and a value of shutter time Tv (for example, for the widest possible opening) in a step S7.

Also, if the manual mode has been determined in the step S3 to be selected, the process then advances straightforward to a step S8.

In the step S8, the shutter 5 and the diaphragm 6 start to be driven to positions determined based on the set values of Tv and Av in the step S2 in the manual mode, or based on the preset values of Tv and Av for flash mode in the flash mode, or based on the compensated value of Tv by the preliminary exposure and the set value of Av in the step S2 neither in the manual mode nor the flash mode.

After that, whether or not the flash mode is selected is checked again in a step S9. If the selected mode is judged to be the flash mode, then fire the flash unit 16 in a step S10. After the flash adjusting operation has been done, the process advances to a step S11. Meanwhile, if it is not the flash mode, then check the passage of the Tv in the step S11. At the termination of passage, the shutter 5 is closed in a step S12. In the next step S13, the signal output from the CCD 1 is read in synchronism with the vertical synchronizing signal of the standard television signal from the driver 7, and this signal is recorded on the magnetic sheet 13 that is rotating in synchronism with the synchronizing signal.

As has been described above, according to the embodiment of the invention, means are provided for prohibiting the exposure compensation by the preliminary exposure when the exposure has been set manually, or when in flash photography, thereby giving an advantage that the reverse compensation or other erroneous compensations are avoided so that the photographer can perform a special exposure control as desired or considered better by his personal experience and insight.

Figure 4:
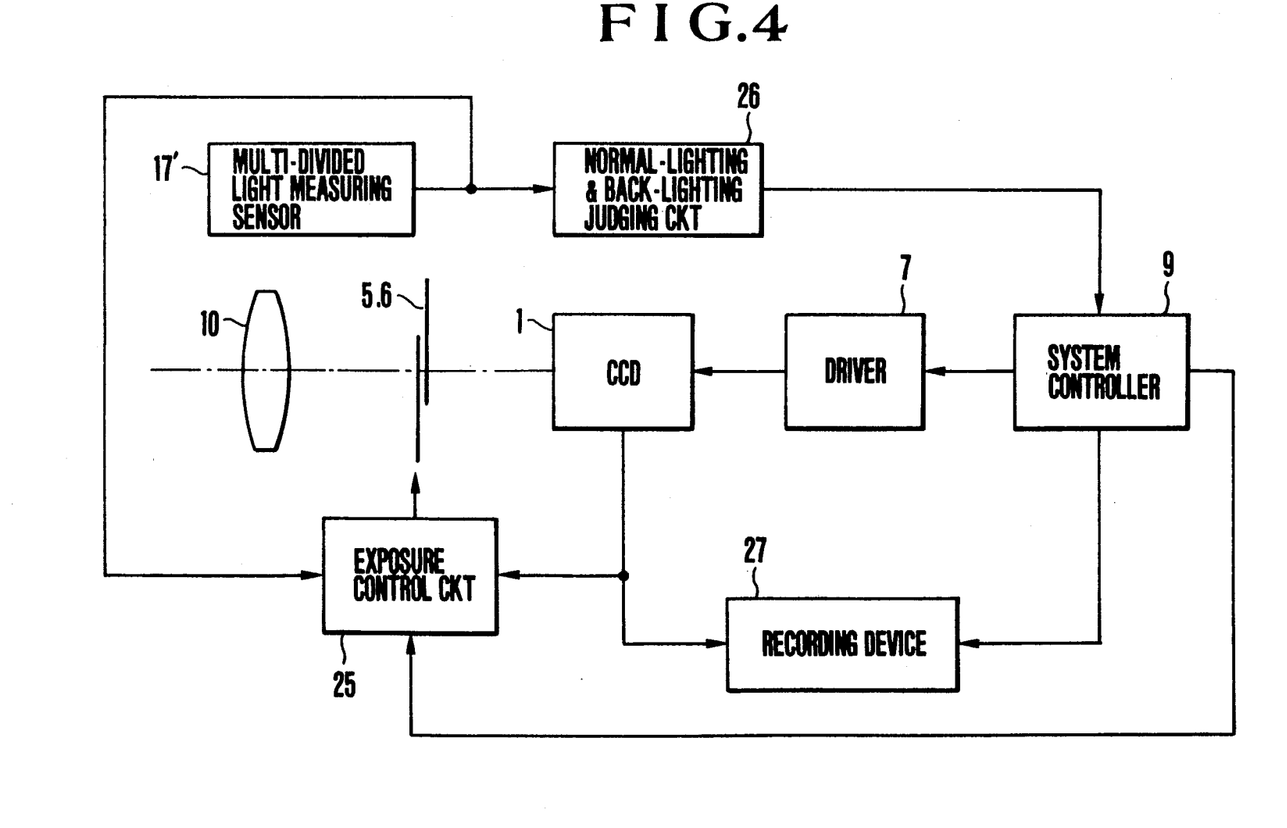
FIG. 4 is a block diagram illustrating the construction of a second embodiment of the invention.
Figure 5:
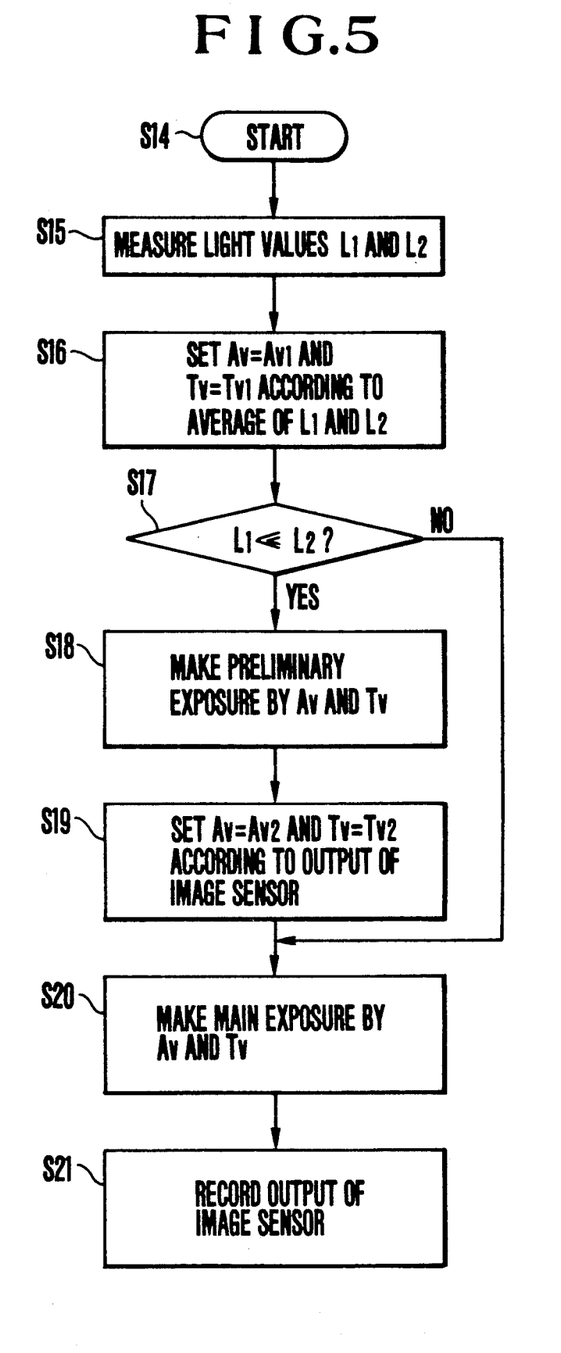
FIG. 5 is a flowchart explaining the operation of the system of FIG. 4.

Next, a second embodiment of the invention is described by using FIG. 4 and FIG. 5.

In the second embodiment of the invention applied to the electronic camera having the photographic lens for forming an object image on the image sensor, the exposure means arranged between the photographic lens and the image sensor, and a light measuring element whose area is divided into a number of parts, provision is made of a normal-lighting and back-lighting judging circuit for determining whether the given photographic situation is a normal lighting condition or back lighting condition by the output of the light measuring element, and an exposure control circuit for controlling the aforesaid exposure in accordance with the output signals of the light measuring element and the image sensor, wherein when the normal-lighting and back-lighting judging circuit has determined that the situation is a normal lighting condition, the exposure value computed by the exposure control circuit on the basis of the output signal of the light measuring element is used in driving the aforesaid exposure means, thus directly entering the main exposure for taking a picture without recourse to the preliminary exposure. Also, when the normal-lighting and back-lighting judging circuit has determined that it is a back lighting condition, the preliminary exposure is first carried out, then the exposure value derived based on the output signal of the light measuring element is compensated by using that signal output from the image sensor which is being produced under the condition of this preliminary exposure, and then this compensated exposure value is used in driving the exposure means to carry out the main exposure for taking a picture.

This embodiment is next described in greater detail by reference to the block diagram of FIG. 4 and the flowchart of FIG. 5.

In FIG. 4 the same reference numerals have been employed to denote the same parts as those shown in FIGS. 1 to 3. A multi-divided light measuring sensor 17' has at least two areas, one of which occupies a central portion and the other of which lies in the marginal portion. The camera further includes an exposure control circuit 25, a recording device 27, and a normal-lighting and back-lighting judging circuit 26 for determining whether the given situation is a normal lighting condition or back lighting condition depending on the brightness difference between the central portion and the marginal portion of the light measuring sensor 17'.

In general, with the camera of such a type as described above in which the exposure value is determined based on the output signal of the multi-divided light measuring sensor 17', when shooting under the normal lighting condition, the exposure value can be computed more or less correctly. But when shooting under the back lighting condition, as the main object lies at the center of the area of the picture, the central portion of the multi-divided light measuring sensor 17' becomes dim, while the marginal portion is bright. This causes the exposure value to shift to a faster one as it is pulled toward the higher brightness of the marginal portion. Therefore, the main object will be photographed as a dark patch or with no detail.

So, in this or second embodiment, as shown in FIG. 4 and FIG. 5, the program begins with start at a step S14. Then the multi-divided light measuring sensor 17' produces an output $L_1$ (for the brightness of the central portion) and another output $L_2$ (for the brightness of the marginal portion) in a step S15. These outputs $L_1$ and $L_2$ are then averaged to obtain a value which is used for altering the aperture value Av to $Av = Av_1$ and the value of shutter speed to $Tv = Tv_1$ on the basis of a predetermined program line (step S16). After that, whether or not $L_1 << L_2$ is examined in the normal-lighting and back-lighting judging circuit 26 for discriminating between the normal lighting condition and the back lighting condition (step S17). If the output of this judging circuit 26 represents the detection of the normal lighting condition, or NO, then drive the exposure members 5 and 6 constituting the shutter and/or the diaphragm according to that value of shutter speed and/or that aperture value which are or is determined based on the exposure value computed from the reliable output of the multi-divided light measuring sensor 17' by the exposure control circuit 25 to obtain the computed exposure value, i.e., $Tv=Tv_1$ or $Av=Av_1$, thus making the main exposure without having to make the preliminary exposure (step S20). The electric charge image output from the main-exposed image sensor 1 is sent to the recording device 27 by the image sensor driver 7, being recorded on a floppy disc or the like, and the shooting is completed (step S21).

The back lighting case (when $L_1<<L_2$ in the step S17) is different from the normal lighting case in that the preliminary exposure is carried out on the basis of the exposure value computed from the output signal of the multi-divided light measuring sensor 17' by the exposure control circuit 25, that is, at first in $Tv=Tv_1$, $Av=Av_1$ (step S18), then the electrical signal obtained from the image sensor 1 by this preliminary exposure is used for comparison with a predetermined reference value for the case of optimum exposure, for example, and then the difference between it and the reference value is reduced to zero in order to compensate the exposure value computed from the output signal of he multi-divide-d light measuring sensor 17' to $Tv=Tv_2$, $Av=Av_2$. Thus a more proper exposure value is obtained (step S19). After that, similarly to the normal lighting case, the exposure members 5 and 6 are driven by the shutter speed $Tv=Tv_2$ and/or the aperture value $Av=Av_2$ to make a main exposure. Then, the electric charge image formed by this main exposure is read from the image sensor 1 and recorded.

As has been described above, by providing for the electronic camera with the normal-lighting and back-lighting judging circuit for discriminating between the normal lighting condition and the back lighting condition by the brightness difference between the central portion and the marginal portion of the multi-divided light measuring sensor, it is possible to obtain a proper exposure in all photographic situations which may be encountered. Also, in comparison with the conventional electronic camera of the type in which the preliminary exposure is always made by ignoring the lighting condition and after that the main exposure is carried out, the camera of the invention, because its selecting the preliminary exposure only in the back lighting condition, consumes far less electrical energy per shot, since a large quantity of electric power is required to drive the image sensor. Moreover, for photography under the normal lighting condition, because the preliminary exposure is omitted, the time required for completing one cycle of shooting operation can be shortened. This enables achievement of an increase of the frame rate at which a series of continuous shots are taken to a higher value than was heretofore impossible.

It should be noted in connection with the second embodiment that though the multi-divided light measuring sensor is designed to discriminate between the normal lighting condition and the back lighting condition, a light measuring sensor having a greater number of divided parts may be used to detect the distribution of brightness of the object (for example, the proportion of the brighter portion to the whole bright area), wherein the exposure control modes are selectively operated depending on that detection result. For example, in a case where the level of brightness is extremely high (low) in part to the average brightness over the entire area of the picture, the preliminary exposure and the main exposure are carried out when taking one picture. In another case where the level distribution of brightness over the entire area of the picture lies within a predetermined brightness level range, without having to make the preliminary exposure, only the main exposure may be made when taking one picture. That is, in other words, when the contrast of information within the picture is large, the preliminary exposure is made, while when the contrast is small, the preliminary exposure may be omitted.

As has been described above, according to the second embodiment of the invention, the exposure can be controlled in optimum manner depending on the distribution of brightness of the object, thereby it being made possible to realize a high speed series of shots. Another advantage is that a minimization of the size of the electronic camera body can be achieved.

Figure 6:
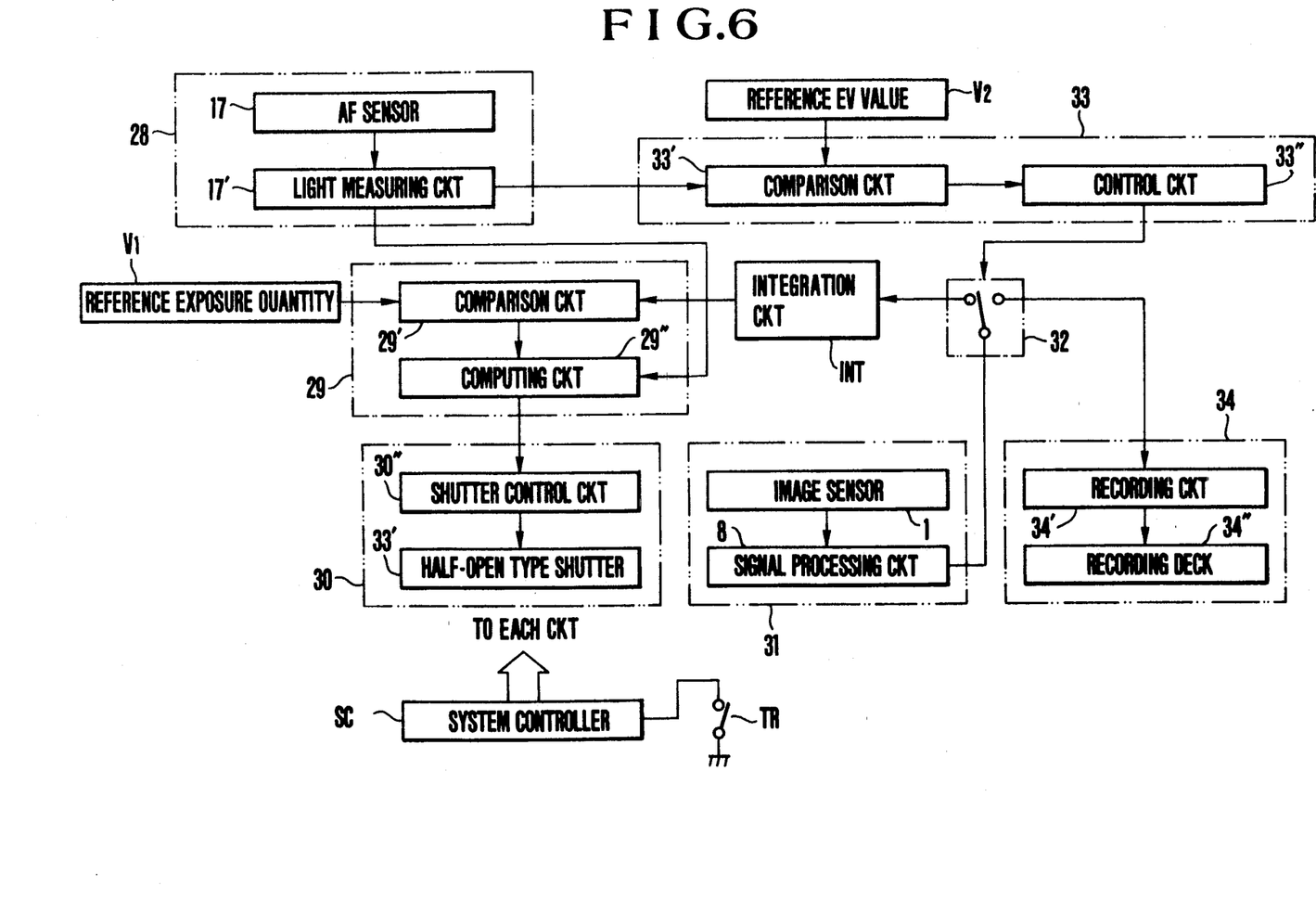
FIG. 6 is an explanation diagram illustrating the construction of circuitry of a third embodiment.
Figure 7:
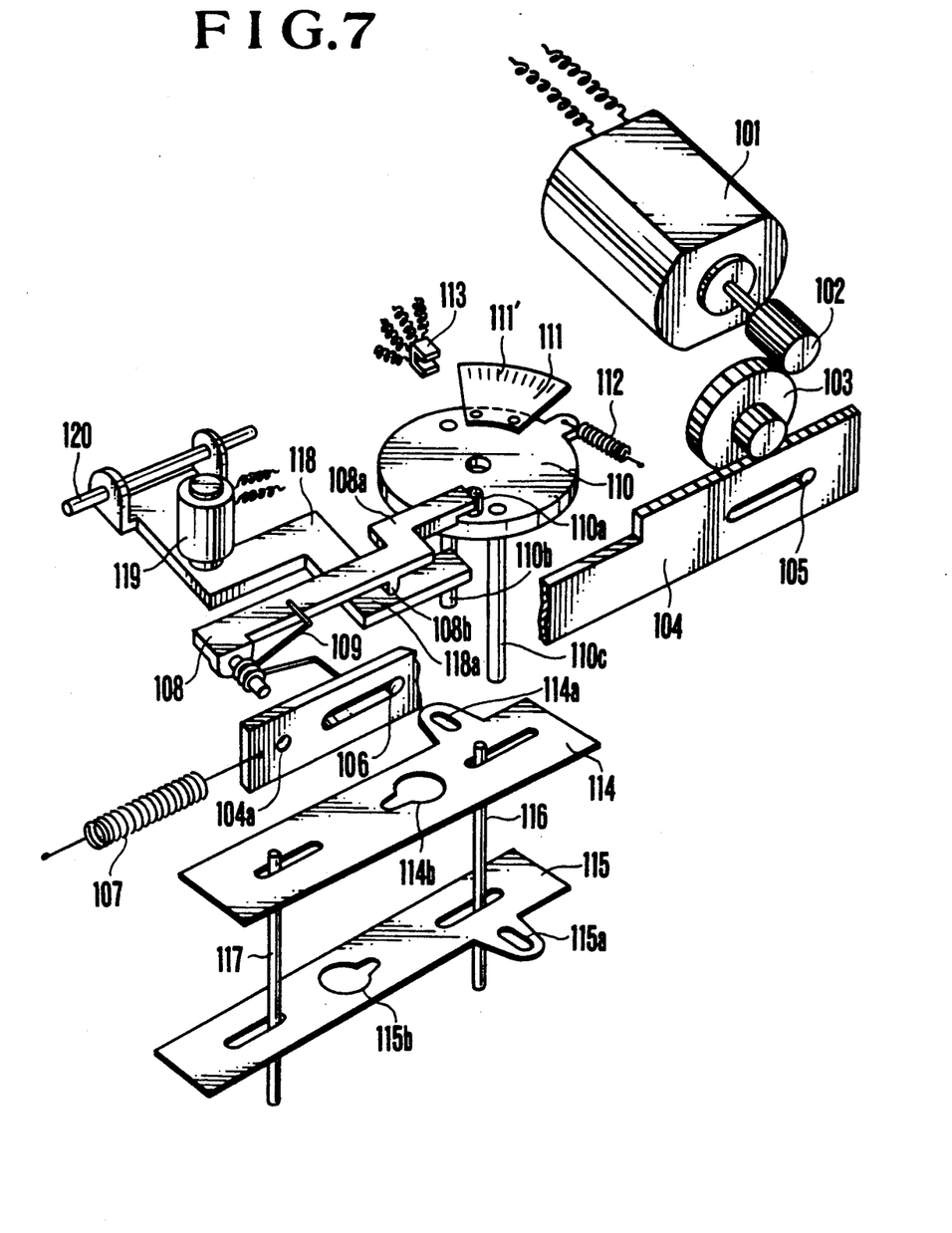
FIG. 7 is a perspective view illustrating a shutter mechanism of that embodiment.
Figure 8:
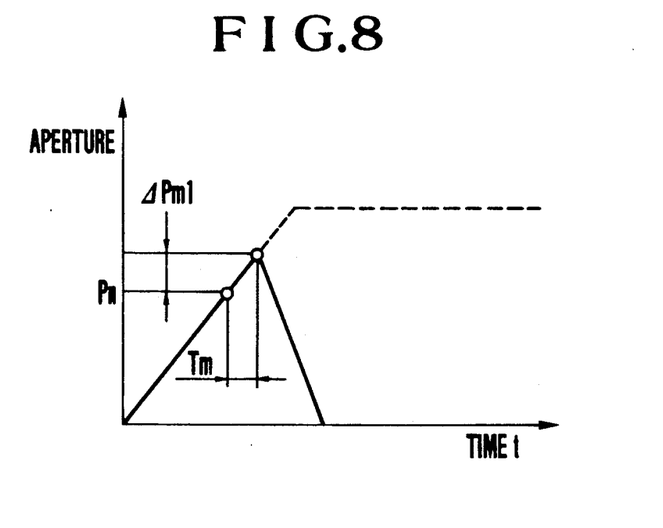
FIG. 8 is a graph explaining the running characteristic of the shutter shown in FIG. 7.
Figure 9:
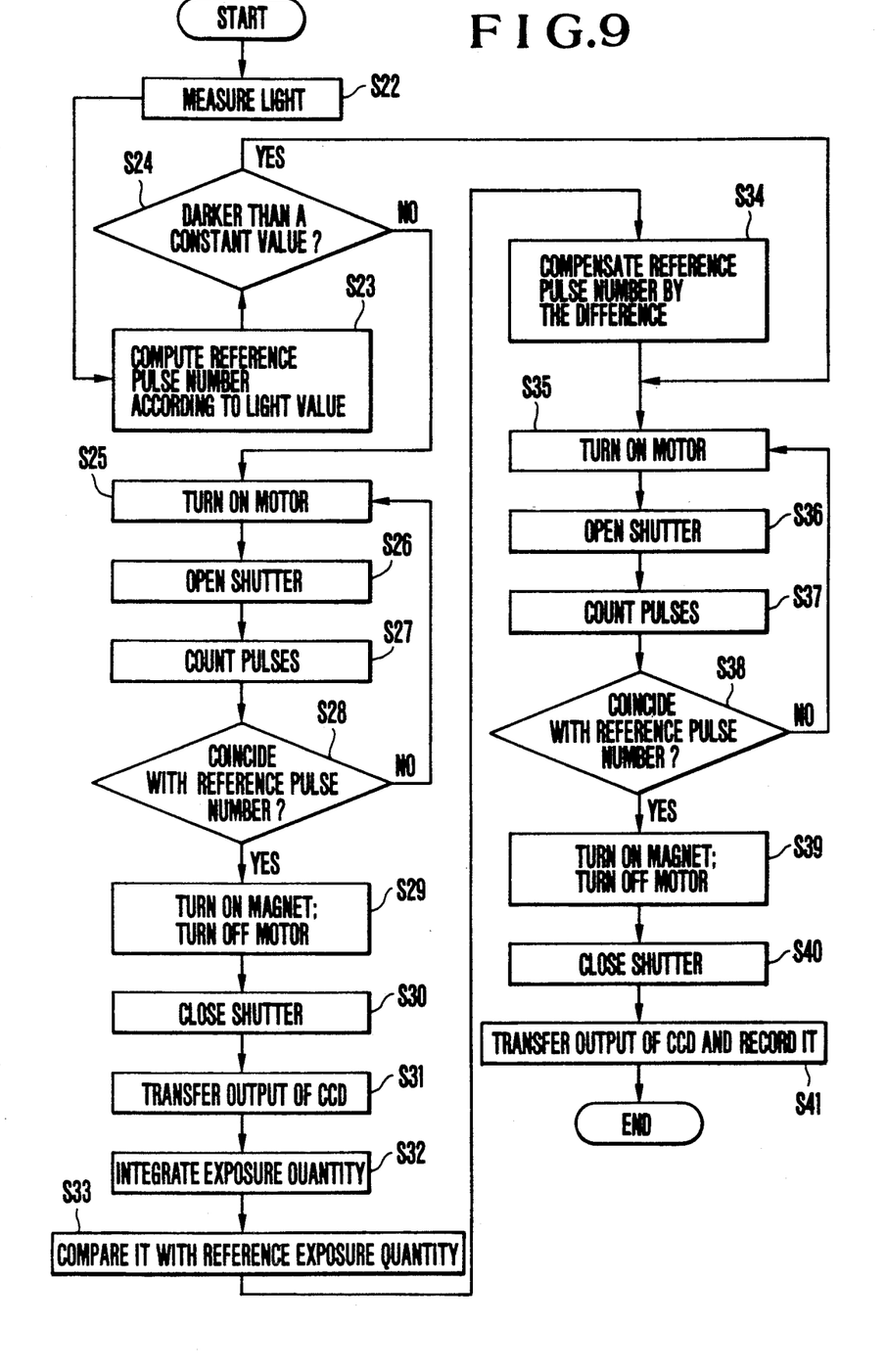
FIG. 9 is a flowchart explaining the operation of the third embodiment.

Next, FIG. 6 through FIG. 9 show a third embodiment of the invention. And, FIG. 6 shows the arrangement of the circuit elements of the third embodiment, FIG. 7 shows the construction of a shutter mechanism, FIG. 8 shows the running characteristic of the shutter when in AE mode, and FIG. 9 shows a flowchart.

In FIG. 6, light measuring means 28 comprises an AE sensor 17 and a light measuring circuit 17'. Computing means 29 comprises a comparison circuit 29' and a computing circuit 29". A shutter unit 30 comprises a half-open type shutter 30' and a shutter control circuit 30". An image sensing unit 31 comprises an image sensor 1 and a signal processing circuit 8. 32 is a switch. Judging means 33 comprises a comparison circuit 33' and a control circuit 33". A recording unit 34 comprises a recording circuit 34' and a recording deck 34".

The output of the AE sensor 17 of the light measuring means 28 is made to be a light value by the light measuring circuit 17'. By putting this into the computing circuit 29" of the computing means 29, a predetermined exposure computation is performed. This computation data is put into the shutter control circuit 30" so that an opening and closing operation is performed by the half-open type shutter 30'. Thereupon, optical image information enters the image sensing unit 31 where an electrical image signal is formed. Also, from the information output from the light measuring means 28, by comparing it with a reference EV value $V_2$ in the comparison circuit 33', the control circuit 33" judges whether or not the preliminary exposure is necessary for taking a picture. Based on this judgment result, the switch 32 supplies the signal output from the image sensing unit 31 to either one of the comparison circuit 29' of the computing means 29 and the recording unit 34. In a case where it goes to the comparison circuit 29' of the computing means 29, there is an integration circuit INT on the way. In the comparison circuit 29' of the computing means 29, the signal is compared with a reference exposure quantity $V_1$. A compensation is made so that their difference becomes zero. This information is sent to the shutter unit 30 when the main exposure operation is performed. After that, the image sensing unit 31 is read again and the signal is conducted through the switch 32 to the recording unit 34 and recorded. Incidentally, SC is a system controller for controlling the entirety of the circuit shown in FIG. 6, and TR is a trigger switch for recording a still picture.

Next, in FIG. 7, the shutter mechanism comprises an electric motor 101, a pinion gear 102, a speed reduction gear 103, a rack gear 104, rack guide pins 105 and 106 guiding the rack gear 104, a return spring 107 for the rack gear 104, a clutch 108 pivotally mounted about a hole 104a of the rack gear 104 and urged by a clutch spring 109 so that its free end engages a pin 110a of a control plate 110, an encoder 111 (pulse disc) adhered on the control plate 110 and whose transparent portion 111' is arranged to move across a photo-interrupter 113, a return spring 112 for the control plate 110, diaphragm blades 114 and 115 guided by common guide pins 116 and 117 and having elongated slots 114a and 115a respectively into which respective pins 110b and 110c mounted on the control plate 110 extend, and having openings 114b and 115b respectively forming a variable size of aperture, and an armature 118 of a magnet arranged upon supply of current to a coil 119 to rotate around a shaft 120 in a counterclockwise direction until its free end 118a strikes a protuberance 108b of the clutch 108 to release a pin 110a of the control plate 110 from the engagement with the free end 108a of the clutch 108.

The operation is described below. At first the normal AE mode is described. After the actuation of a release by the trigger switch TR, when the motor 101 rotates in the clockwise direction and the speed reduction gear 103 rotates in the counterclockwise direction, the rack gear 104 starts to slide to the right against the spring 107. The clutch 108 mounted on the rack gear 104 also slides to the right. Therefore, the pin 110a of the control plate 110 is pushed by the free end 108a of the clutch 108 and the control plate 110 is rotated in the counterclockwise direction against the spring 112, so that the diaphragm blade 114 is caused to slide to the left by the pin 110b and the diaphragm blade 115 is caused to slide to the right by the pin 110c. Thus, the diaphragm goes opening. At the same time, as the pulse disc 111 on the control plate 110 rotates in the counterclockwise direction, the photo-interrupter 113 goes counting the transparent portion 111' of the pulse plate 111. When a predetermined pulse number is reached, the coil 119 is supplied with current to attract the armature 118 upward. The free end 118a then strikes the protuberance 108b of the clutch 108 so that the extension 108a is disengaged from the pin 110a. Therefore, the control plate 110 is rotated in the clockwise direction by the return spring 112, while its pins 110b and 110c returning the diaphragm blades 114 and 115 to thereby close the shutter. After that, the motor 101 is rotated in the reverse direction, causing the rack gear 104 to slide to the left or to return to the initial position. Thus, a sequence of operations ends.

The variation of the size of aperture opening in this sequence is shown in FIG. 8.

In FIG. 8, in the case of the AE mode, after the actuation of a camera release, the diaphragm is gradually opening. Along with this, the number of pulses proportional to the aperture value as counted in connection with the diaphragm is increasing. When it has reached a predetermined reference pulse number Pn, the magnet is energized. After a delay time Tm owing to the action of the magnet, the shutter is released from the connection with the clutch and rapidly closes. This time lag results in production of an aperture opening error which amounts to $\Delta Pm_1$.

Next, in FIG. 9, as shown in the flowchart for the operation of the system controller SC of this embodiment, depending on whether the value obtained by the light measurement is darker or brighter than a certain constant value, control is made with selection of the following modes.

That is, the value obtained by the light measurement is converted into an equivalent number of standard pulses. By comparing this number with a reference pulse number, if the light value is determined to be darker than the certain value so that a long time is necessary for making the exposure, then skip over the step of making the preliminary exposure. If the light value is brighter than the certain value, then make the preliminary exposure.

In the following, explanation is made in greater detail. That is, when the trigger switch TR is actuated, the AE sensor 17 in the light measuring means 28 detects the brightness of the object in a step S22. Its data is counted in the form of a number of standard pulses by the light measuring circuit 17' in a step S23. Whether or not this counted value is larger than a counted value of the reference EV value $V_1$ is then determined by the comparison circuit 33' in a step S24. By this comparison result, if the output of the AE sensor 17 is larger than the counted value of the reference EV value $V_1$, as it implies that the object is brighter than a predetermined level, the process then advances to a step S25 where the motor 101 is turned on. Thereupon, as has been described above, the shutter blades start to open. Thus, the preliminary exposure is started (step S26). In accompaniment with this, the pulse disc 111 rotates. Therefore, the photo-interrupter 113 counts the number of passed gradients of the transparent portion (step S27), until it comes to coincide with the aforesaid reference pulse number (step S28). When in coincidence, the magnet coil 119 is then supplied with a current in a step S29. At the same time, the motor 101 is turned off.

By this, as has been described above, the control plate 110 rotates under the action of the bias spring 112, closing the shutter.

After that, in a step S31, the signal of the image sensor 1 is read and supplied through the switch 32 to the integration circuit INT to integrate the exposure quantity (step S32).

This integrated value is compared with the reference exposure quantity $V_1$ (step S33). Based on this comparison result (difference), the computing circuit 29" compensates the aforesaid reference pulse number so that the aforesaid difference becomes zero in a step S34. In the next step S35, the motor 101 is turned on again, opening the shutter. Thus, a main exposure is started (step S36). Similarly to the step S27, the transparent portion 111' of the pulse disc 111 is counted (step S37). Such a procedure is repeated until this counted value coincides with the compensated reference pulse number (step S38). Upon coincidence, in a step S39, the magnet coil 119 is then supplied with a current and the motor 101 is turned off. The shutter is then closed in a step S40, thus terminating the shooting with the main exposure.

After that, as has been described above, the signal of the image sensor 1 is read and supplied through the switch 32 to the recording unit 34 and recorded as still picture information (step S41).

As has been described above, according to the third embodiment of the invention, in a case where the opening and closing operation of the opening and closing members is determined to take a longer time than a constant value based on the value output from the element for measuring the quantity of light of the target to be shot, the preliminary opening and closing operation is not performed. Yet it becomes possible to carry out the exposure or opening and closing operation based on that value output from the element for measuring the quantity of light of the target to be shot. In other words, the element for measuring the quantity of light of the target to be shot produces a value which becomes, for the first time, the reference value for the opening and closing operation with the result of a non-exposure. Based on this value, whether or not the non-exposure opening and closing operation has to be made is judged so that even if there has been a change in the running characteristic of the opening and closing members such as the diaphragm blades, the accuracy of control can be prevented from lowering due to that change. Nevertheless, the camera does not become inconvenient to use in actual practice. Thus, the high accuracy of exposure control can be preserved. Also, in a case where two consecutive cycles of opening and closing operation of the opening and closing members have been judged to be unnecessary, because the preliminary opening and closing operation is not performed, or only one cycle suffices, the number of times the shutter sound is produced is reduced. Moreover, there becomes no need to maintain the diaphragm stationary in the open state for a long time.

Figure 10:
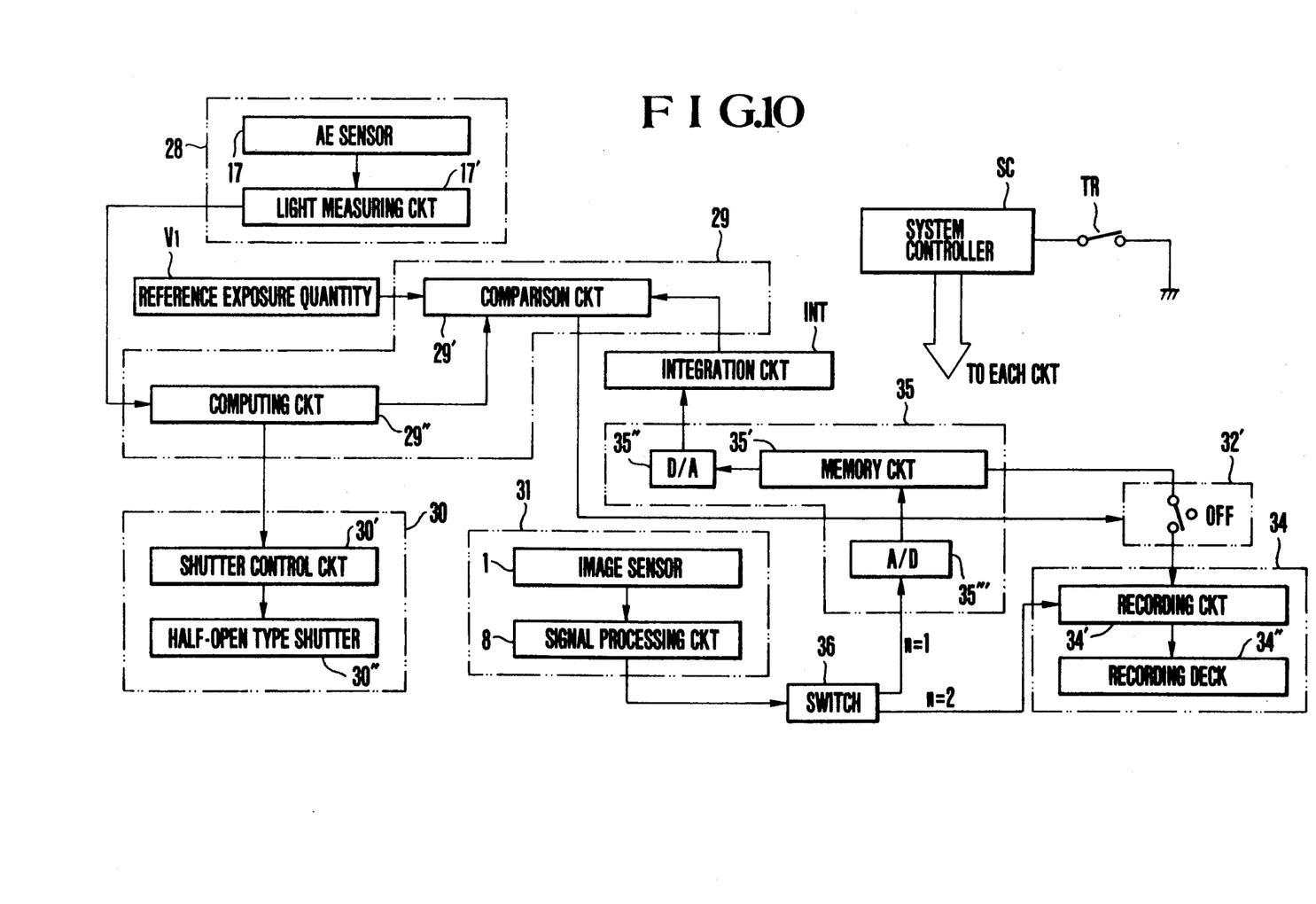
FIG. 10 is a production diagram of a fourth embodiment of the invention.
Figure 11:
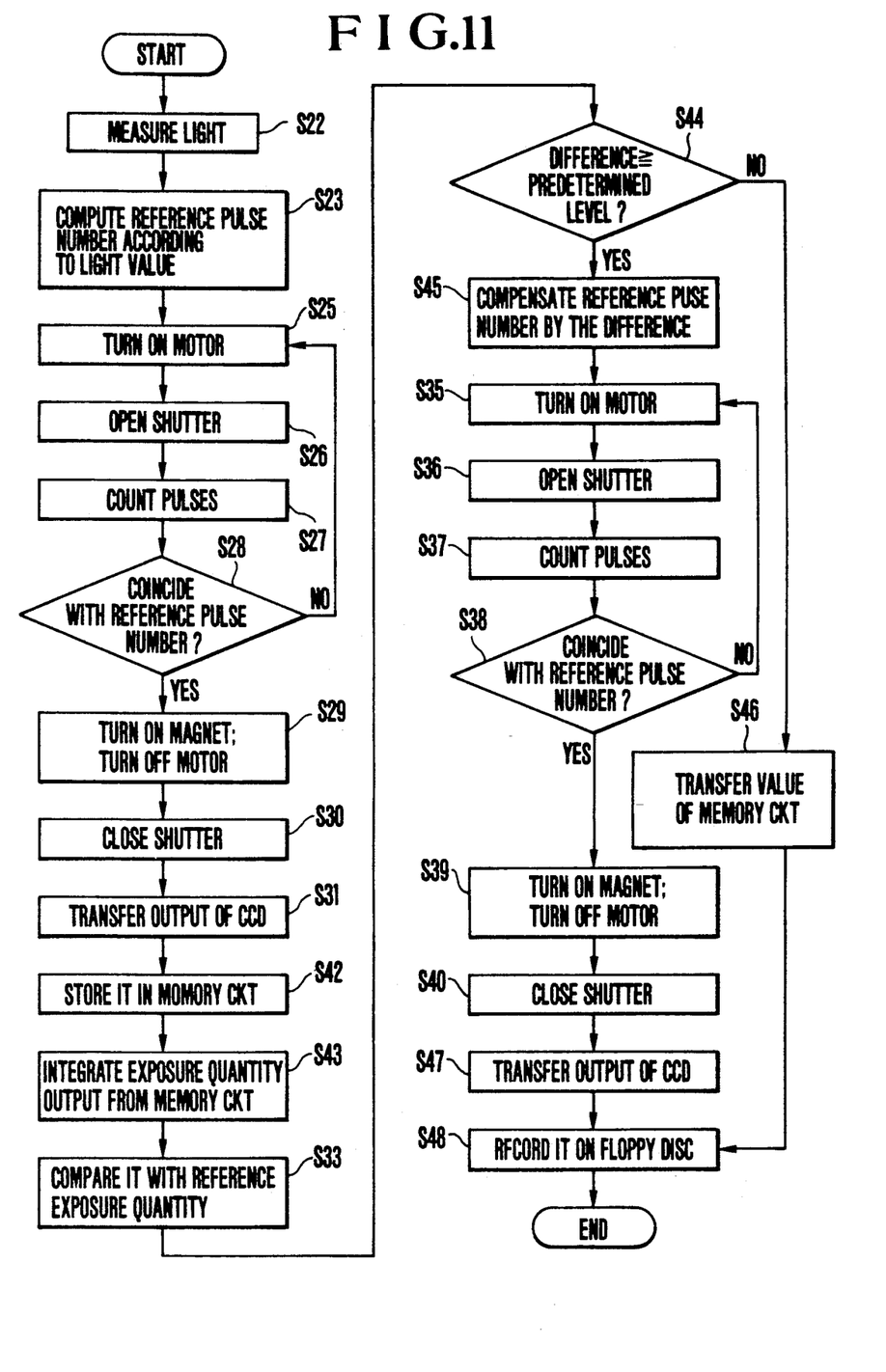
FIG. 11 is a flowchart for that embodiment.

Next, FIG. 10 shows the construction of a fourth embodiment of the invention and FIG. 11 is a flowchart therefor. In this embodiment, an exposure operation is once performed based on the output of the light measuring element. The video signal at this time is once stored in a memory. From this memory, the image information is non-destructively read out and whether it lies within a reference level range is tested. If so, then use the image information of the memory directly for the recording purpose. If not so, then use the image information stored in the memory as the preliminary exposure data, based on which the error is compensated for. After the exposure members have been controlled by taking this compensation into account, another exposure operation is carried out. This becomes the so-called main exposure.

The image information obtained by this main exposure is used in recording.

Next, FIG. 10 and FIG. 11 are explained in detail, where the same reference numerals have been employed to denote the similar parts to those shown in FIGS. 1 through 9. 35 is a provisional memory unit having a D/A converter 35", a memory circuit 35' and an A/D converter 35'''. 36 is a switch. 32' is a switch.

Referring next to FIG. 11, an example of the manner in which the system controller SC of the circuit of FIG. 10 operates is described.

The first steps S22–S31 are the same as in the flowchart shown in FIG. 9 except that the step S24 is excluded. So, their explanation is omitted. The video signal of the CCD which has been transferred and read in the step S31 is supplied to the switch 36 in a step S42. The output for the first time through the switch 36 is supplied through the A/D converter 35''' to the memory circuit 35' and stored therein (step S42). After that, in a step S43, this stored data on the memory circuit 35' is non-destructively read out, then converted into an analog signal by the D/A converter 35", and then integrated by the integration circuit INT. Thus object luminance information is formed. Subsequently, this luminance information is compared with the reference exposure quantity $V_1$ in the comparator circuit 29' in the step S33. Whether or not the difference between it and the reference exposure quantity $V_1$ is larger than a predetermined level is judged in a step S44. If the result of this judgment is that the difference is larger than the predetermined level, then compensate the reference pulse number so that this difference becomes zero (step S45). After that, by the steps S35–S40, the main exposure operation is carried out based on the aforesaid compensated reference pulse number.

Also, after that, the electrical signal output from the image sensor 1 is transferred and read out in a step S47. This signal is supplied through the switch 36 to the recording unit 34 and recorded on the floppy disc in a step S48.

If, in the step S44, the difference between the luminance information output from the memory circuit 35' and the reference exposure quantity is smaller than the aforesaid predetermined level, on the other hand, the video signal stored in the memory circuit 35' in the step S46 is supplied through the switch 32' to the recording unit 34 and recorded in the step S48.

As has been described above, according to the invention, in the first cycle of opening and closing operation with the result of a non-exposure, a value is detected which is once stored in the memory circuit. This value is then integrated to obtain an exposure quantity. As it is compared with the reference exposure quantity, if their difference is larger than a certain value, the second cycle of opening and closing operation is then carried out by taking into account the compensation of the value obtained in the non-exposure opening and closing operation. If the difference is below the certain value, the value of the memory circuit is recorded as it is on the recording medium such as a floppy disc, whereby the feedback exposure is not done as it is regarded as unnecessary. Thus, without causing nothing wrong to happen on actual practice, the exposure quantity can be controlled with high accuracy.

What is claimed is:

1. An image sensing device comprising:
   (a) image sensing means for converting an optical image of an object to be photographed into an electrical signal;
   (b) detecting means, arranged separately from said image sensing means, for detecting a brightness of said object to be photographed; and
   (c) control means, responsive to a first photoelectric converting operation in a first predetermined condition in response to a detection output of said detecting means furnished to said control means and providing information on a first optical image of said object to be photographed, for executing a first mode in which said information is recorded, and for selectively thereafter executing a second mode in which said information on the first optical image is compared with a predetermined reference information which provides an optimum photographing condition for a main portion of the object for obtaining a comparison result, the first condition is compensated based on said comparison result to obtain a second condition, a second photoelectric converting operation is performed in the second condition, and information on a second optical image of said object to be photographed obtained by said second photoelectric converting operation is recorded.

2. A device according to claim 1, further comprising exposure control means for causing said control means to execute said first and second photoelectric converting operations.

3. A device according to claim 2, wherein said exposure control means includes a shutter for selectively blocking light incident on said image sensing means.

4. A device according to claim 2, wherein said exposure control means controls a photoelectric converting operation by controlling a period from a moment at which said image sensing means has been cleared of the electrical signal to a moment at which a stored electrical signal is read out from said image sensing means.

5. A device according to claim 2, wherein said exposure control means includes a diaphragm.

6. A device according to claim 2, wherein said exposure control means includes a half-open type shutter.

7. A device according to claim 1, further comprising a disc-shaped recording medium for recording information on the first or second optical image.

8. A device according to claim 1, further comprising switch means for manually selecting said first mode, said control means not executing said second mode on such manual selection of said first mode.

9. A device according to claim 8, wherein said switch means includes an exposure compensating switch for manually correcting an AE value.

10. A device according to claim 1, further comprising flash illuminating means for illuminating the object.

11. A device according to claim 10, further comprising prohibiting means for prohibiting the second mode when illuminating is effected by using said flash illuminating means.

12. A device according to claim 1, further comprising discriminating means for discriminating a brightness distribution of the object on the basis of an output of said detecting means.

13. A device according to claim 12, wherein said control means executes both of the first and second modes according to a discrimination result of said discriminating means.

14. A device according to claim 12, wherein said discriminating means discriminates whether the object brightness distribution is a normal lighting condition or a back lighting condition.

15. A device according to claim 12, wherein said discriminating means discriminates whether or not a contrast of the object brightness distribution is great.

16. A device according to claim 1, wherein said control means executes both of the first and second modes according to the magnitude of said detection output of said detecting means.

17. A device according to claim 1, wherein said control means executes the first mode when said detection output of said detecting means is not within a predetermined level range and does not execute said second mode.

18. A device according to claim 1, further comprising a digital memory for storing the information on the first optical image.

19. A device according to claim 18, further comprising recording means of larger capacity than said digital memory for recording information stored in said digital memory.

20. A device according to claim 1, further comprising memory means for temporarily storing the information on the first optical image in the first mode and means for prohibiting the second mode in response to a state of the information on the first optical image stored in said memory means.

* * * * *

UNITED STATES PATENT AND TRADEMARK OFFICE
CERTIFICATE OF CORRECTION

PATENT NO. : 5,189,519
DATED : February 23, 1993
INVENTOR(S) : Ryosuka Miyamoto, et al.

It is certified that error appears in the above-identified patent and that said Letters Patent is hereby corrected as shown below:

| | |
|---|---|
| Figure 11 | Change "PUSE" to -- PULSE -- |
| Col. 3, line 44 | Change "operation" to -- operations -- |
| Col. 3, line 44 | Change "is" (2nd occ.) to --are not--. |
| Col. 3, line 52 | Change "more easy" to -- easier -- |
| Col. 5, line 15 | Delete "of" |
| Col. 6, line 59 | Delete "made" |
| Col. 9, line 33 | Change "multi-divide-d" to -- multi-divided -- |
| Col. 9, line 52 | Change "its" to -- it is -- |
| Col. 14, line 42 | Change "nothing" to -- anything -- |
| Col. 14, line 43 | Change "on" to -- in -- |

Signed and Sealed this

Thirtieth Day of November, 1993

Attest:

BRUCE LEHMAN

Attesting Officer

Commissioner of Patents and Trademarks